Aug. 25, 1959 H. S. YOUNG 2,900,713
METHOD OF MAKING REINFORCED HONEYCOMB STRUCTURES
Filed May 31, 1955
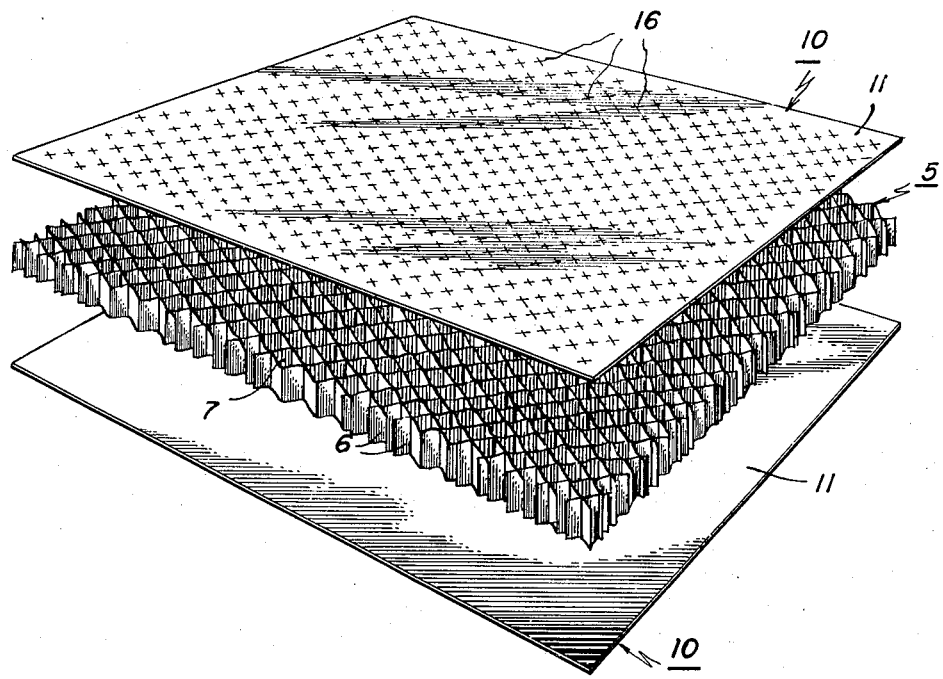
Fig. 1
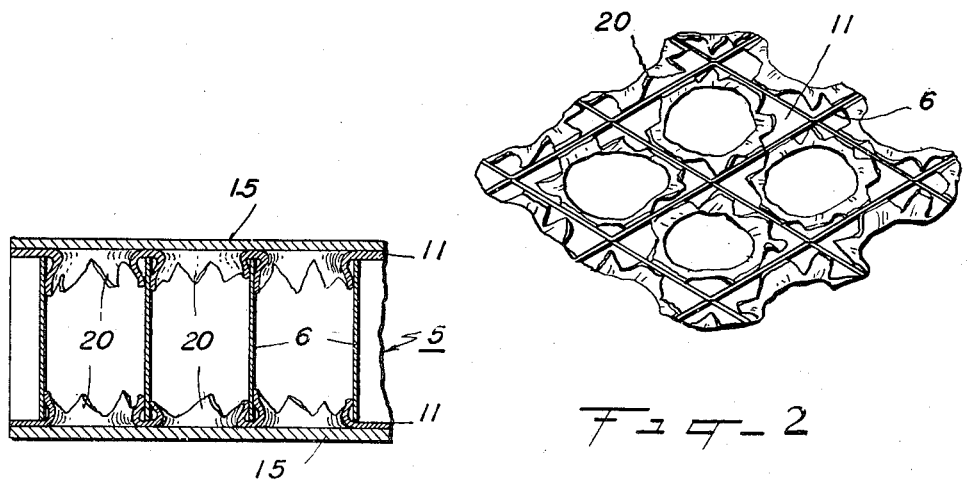
Fig. 3
Fig. 2
INVENTOR.
H. S. YOUNG
BY J. M. Trundle

United States Patent Office 2,900,713
Patented Aug. 25, 1959

2,900,713

METHOD OF MAKING REINFORCED HONEYCOMB STRUCTURES

Harold S. Young, Chula Vista, Calif.

Application May 31, 1955, Serial No. 512,120

3 Claims. (Cl. 29—475)

The present invention relates to improvements in honeycomb structures, and more particularly to a method of making honeycomb structures for use in reinforced sections of aircraft and the like. The honeycomb structure produced by the method being of unique construction and adapted for many uses.

One object of the invention is to form a honeycomb structure from thin strips of metal arranged in a honeycomb pattern to provide a series of cells in which the cells are reinforced and strengthened by means of a brazing sheet which is punched at spaced intervals throughout its area in order to displace metal into the cells of the honeycomb structure and thus insure a perfect braze between an outer skin covering and the cellular honeycomb structure.

Another object is to provide a brazing sheet having a plurality of weakened portions of various shapes and forms throughout its entire area and arranged to correspond in position to the cells of a honeycomb structure such that said weakened portions may be punched through with an instrument such that the metal will be displaced into the cells of the honeycomb structure and will frictionally grip the walls thereof to enable the brazing operation to be carried out more efficiently and without requiring the use of special forms and the like for holding the cellular honeycomb.

Another object is to eliminate machining of the edges of the cellular honeycomb structure which has heretofore been required in order to clean the surfaces and remove oxides for the brazing operation.

Another object is to provide a honeycomb structure which can be pre-shaped prior to the application of the opposite skin surfaces and held in a pre-set position by the brazing sheet which is affixed to the honeycomb cell structure by the punched out portions being bent inwardly into the cells so as to frictionally grip the same prior to the application of the skin structure. Thus, the cellular honeycomb structure with the brazing sheets may be pre-set to any desired shape before the brazing operation to secure the opposed outer skin surfaces to the cellular structure.

Another object is to provide a method of making cellular honeycomb structures by applying a sheet of brazing material to the opposite sides of the cellular honeycomb and then displacing metal in said brazing sheet into the cells of said honeycomb so that when the outer skins are applied to the brazing material sheets and subjected to a brazing temperature the brazing sheet will be brazed to the outer skin and the portions punched into the cells of the honeycomb will be brazed to the side walls of the cellular honeycomb.

Another object is to provide an outer skin covering for a cellular honeycomb structure that is positively secured to the cellular structure such that minute inspection of the finished product will be lessened, and the finished product will be far superior to honeycomb structures produced under present day methods.

Another object of the invention is to provide a method of making honeycomb structures which may be bent to various shapes such as around plane wings, fins, and tips prior to the application of the outer skin members, and said cellular structure may be held in such a position by the brazing sheet being interlocked with the cellular structure at certain intervals.

Another object is to provide a method of making honeycomb structures by the application of a brazing sheet between the edges of the cellular honeycomb and the outer skin covering and then punching the metal into the cellular structure before brazing so that the heat of the braze temperature will cause the metal which has been displaced into the cells of the honeycomb to be drawn into contact with the cell walls, and thus a perfect bond will result between the cellular unit and skin covering of the honeycomb structure.

It has been found that honeycomb structures have been produced by forming a plurality of strips into a cellular unit by criss-crossing the strips one with the other and arranging the strips on edge. After the cellular honeycomb unit has been formed the cells are filled with a plastic material which will readily melt under a temperature lower than the melting point of the metal strips. After the material has been poured into the cellular structure, the edges thereof are then machined in order to clean the surfaces at the edges preparatory to the brazing operation. Brazing paste or metal is then applied and the outer metal skin is then mounted on the brazing metal or paste and the assembly secured together by clamps and a frame and placed in a furnace at a temperature sufficient to melt the brazing paste or material, but below the lower critical temperature of the honeycomb and outer skin plates.

The above process is quite expensive and requires considerable time to insure the removal of oxides from the edges of the metallic honeycomb by machining. In the method practiced in the present invention, such machining is not necessary due to the fact that the brazing sheet is provided with weakened portions which may be readily punched into the cells of the metallic honeycomb so that the displaced metal will frictionally grip the cell walls and when brazing the outer skin in place on the brazing sheet by subjecting the assembly to a brazing temperature, the brazing sheet will adhere and be bonded to the cell walls as well as to the outer skin covering. This construction enables a honeycomb structure to be produced in which the outer skin covering is securely fastened and bonded to the edges of the honeycomb cells such that a perfect bond results around each cell between the honeycomb and outer skin covering.

Other objects and advantages of the invention will become apparent during the course of the following description of the accompanying drawing, wherein:

Figure 1 is an exploded perspective view showing a cellular honeycomb spaced from a pair of opposed sheets of brazing material which are provided with weakened portions throughout the entire area arranged to correspond in position to the cells of the metal honeycomb.

Figure 2 is an enlarged fragmentary bottom elevational view showing the manner in which the brazing sheet is punched to displace the metal around the edges of the weakened portions into frictional engagement with the walls of the cellular metal honeycomb, and;

Figure 3 is an enlarged fragmentary vertical cross-sectional view of the honeycomb structure after the outer skins have been applied to both sides of the cellular metal honeycomb with the brazing sheet sandwiched therebetween and punched so that the edges of the weakened portions of the brazing sheet engage the cell walls.

In the drawing, and more in detail, there is shown for the purpose of illustration a honeycomb unit generally designated 5 which is formed of metal strips 6 of uniform width bent at intervals and secured together to form a plurality of cellular spaces 7. There are numerous ways of making metal honeycomb units 5 and usually, such units are constructed of strips 6 of aluminum or light metal alloy and are .002 to .003 of an inch in thickness. Various other metals other than aluminum alloys may be used in the present invention, but due to its lightness and adaptation to aircraft structures, aluminum or magnesium strips 6 in the formation of the honeycomb structure 5 are used. Various magnesium alloys have been successfully used in the formation of honeycomb structures.

The invention consists in providing a sheet generally designated 10 formed of a brazing material sheet 11 having a composition of 25 percent manganese, 65 percent nickel, 3 percent silicon and 1 percent iron which is adapted to form a brazing or filler material to secure the outer skin covering 15 (Fig. 3) to the cellular metal honeycomb unit 5.

The filler or brazing sheet 11 is provided with a series of uniformly spaced weakened portions 16 which may be of a number of different selected shapes such that when the weakened portions are struck with a punch the metal surrounding the weakened portion will be displaced into frictional engagement with the walls 6 of the honeycomb unit 5. The brazing or filler material sheet 11 has a melting point below that of the cellular honeycomb unit 5 and outer skin covering 15, and is adapted to be subjected to temperatures in a range between 1100° F. and 1800° F. Obviously, filler material sheets of other alloys may be used depending upon the metal alloy of which the honeycomb 5 is constructed as well as the metal composition of the outer skin covering 15. Various brazing sheets or filler material for different metals may be found in the Metals Handbook 1948 edition on pages 78 to 81 inclusive. In addition, suitable fluxes in accordance with the disclosure in the Metals Handbook may be used such as borax and the like. In working with magnesium and aluminum alloys, it is necessary that a flux be selected that will not cause rapid oxidation of the metallic edges of the honeycomb unit 5. Fluxes for use in brazing various metals such as disclosed in the following patents can be used; 777,546, Schaap, December 13, 1904; 838,211, Rennie, December 11, 1906; 767,339, Hiller, August 9, 1904; 1,222,025, Wagner, July 23, 1929, and 1,741,031, Miller, December 24, 1929.

The weakened portions 16 are uniformly and correspondingly spaced to coincide with the cells of the metal honeycomb unit 5. Thus, when a punch is placed over a weakened portion and struck a blow with a hammer or the like, the metal will be deformed and will be displaced into frictional contactual engagement with the cell walls 6 as well as extending along the top edges of said walls. Thus, the metal honeycomb unit 5, may, if desired, be bent or shaped to any desired contour and then the sheet 11 applied and punched so that the metal at the weakened portions will be projected into the cells of the honeycomb 5 and engage the walls thereof. This will hold the cellular structure 5 in a pre-set position prior to the brazing operation. While the weakened portions 16 have been shown as being of cruciform design, it is obvious that they may be diamond-shaped, circular or any other shape to conform to cellular honeycomb units having cells shaped other than square.

The weakened portions 16 may be formed by rolling the sheet between suitable rolls having projections to impress the weakened portions in one surface of the metal sheet 11 or by any other approved method and machinery.

In previous methods, the honeycomb unit 5 has been filled with a thermo-setting plastic material under the trade name Cerrobend which holds the cellular structure sufficiently rigid to enable the top and bottom edges of the honeycomb to be machined and thus cleaned. After the machining operation the honeycomb unit is subjected to heat to melt the filler such as Cerrobend and leave the metal honeycomb in condition for brazing. In the present invention this method is eliminated, since the jagged displaced metal portions 20 are projected into the cells of the metal honeycomb structure 5 and frictionally engaged with portions of the cell walls such that when the outer skin 15 is applied and the assembly subjected to a brazing temperature within a range of 1100° F. to 1800° F. the projecting portions 20 will contact relatively clean surfaces of the metal walls and will thus eliminate the necessity of machining the upper edges.

In view of the fact that the projecting portions 20 engage relatively large areas of the cell walls in comparison to the small area of the edges of the cells, a better braze is produced with the brazing or filling metal extending down the sides of the cells, as well as to the upper edge. In addition, it will be seen that the filler or brazing sheet 11 provides a relatively large surface between the upper edge of the metal cellular structure 5 and the outer skin covering member 15 which may be of aluminum alloy or the like.

The method may be carried out by finally placing the assembled metal honeycomb unit 5 with the sheets 11 sandwiched between the outer skin coverings 15 into a brazing furnace and subjecting the assembly as shown in Figure 3 to a temperature as set forth above which is sufficient to braze the cellluar metal honeycomb 5 to the outer skin covering sheets 15 without melting the same. The temperature of the brazing furnace depends, of course, upon the metals used and in the event that aluminum is used with a slight copper content of say, 3 percent, the brazing temperature should not be higher than 1100° F. which is the temperature of its solid point. In this event, the sheet 11 may have a chemical composition similar to the one given above and adjusted so that it will form a brazing bond at a temperature up to 1100° F., or the solid point of the cellular metal honeycomb 5 and outer skin sheets 15, which should be of the same metal composition or alloy as the cellular metal honeycomb 5.

Thus, it will be seen that the sheet 11 will securely bond the outer skin 15 to the cellular metal honeycomb 5 throughout a greater area than has heretofore been attained, and by reason of this greater bond area, a more secure braze is obtained resulting in a more rigid reinforced honeycomb structure.

It is to be understood that the form of the invention herewith shown and described is to be taken as a preferred form of the invention, and that various changes in the shape, size and arrangement of the parts may be resorted to without departing from the spirit of the invention.

What I claim is:

1. In a method of making reinforced panels from metallic cellular structures having uniformly dimensioned and aligned openings comprising, placing a sheet of metal brazing material having affinity for the metal of said structure and provided with weakened zones corresponding in spacing to that between the centers of said openings superposed on said cellular structure with the zones aligned with said openings, punching said sheet in the area of said weakened zones to displace metal into the openings of said cells of said structure and cause the displaced metal to frictionally engage the walls of said openings, superimposing a metal covering sheet on the brazing sheet, and subjecting the assembly to a brazing temperature corresponding to the melting point of the brazing sheet to cause the displaced metal to be bonded to the cellular structure and the surface of said brazing sheet to said covering sheet.

2. In a method of making a reinforced panel structure from a metal honeycomb unit having a series of uniformly dimensioned and aligned openings comprising, superimposing a metal brazing sheet having affinity for the metal of said honeycomb structure and provided with a plurality of weakened zones corresponding in spacing to that between the centers of said openings over said metal honeycomb, said sheet being superimposed on the metal honeycomb with the zones aligned with the openings, punching said sheet throughout the entire area at the weakened zones corresponding to the position of the openings in said honeycomb unit to displace metal from said sheet into said openings and cause the same to frictionally engage and grip the walls of said cell openings, superimposing a metal skin covering sheet over said brazing sheet, and finally subjecting the assembly to a brazing temperature corresponding to the melting point of the brazing sheet to thereby melt the brazing sheet and cause the displaced portions of said brazing sheet to be bonded to the honeycomb structure and the metal skin covering to be bonded to the brazing sheet.

3. In a method of making a reinforced light weight panel structure for use in aircraft comprising forming a metal honeycomb structure to provide a series of uniformly dimensioned and aligned cellular openings, superimposing thereover a metal sheet of brazing material having affinity for the metal of the honeycomb structure and provided with a plurality of weakened zones corresponding in spacing to that between the centers of said openings and having a melting point lower than the melting point of the honeycomb structure, said brazing sheet being placed in superimposed relation on the honeycomb structure with the weakened zones aligned with the cell openings, punching said brazing sheet at points corresponding to the openings in said cellular structure to displace metal into frictional engagement with the walls of said openings, placing a metal cover sheet in superposed relation over the brazing sheet, and finally subjecting the assembly to a brazing temperature in a brazing furnace corresponding to the melting point of the brazing sheet but low enough to permit the honeycomb structure and metal cover sheet to remain in a solid condition.

References Cited in the file of this patent

UNITED STATES PATENTS

| | | |
|---|---|---|
| 649,204 | Grouvelle et al. | May 8, 1900 |
| 1,823,028 | Caldwell | Sept. 15, 1931 |
| 2,004,182 | Arey | June 11, 1935 |
| 2,164,629 | Sibley | July 4, 1939 |
| 2,232,176 | Guthrie | Feb. 14, 1941 |
| 2,273,099 | Gilbert | Feb. 17, 1942 |
| 2,341,752 | West | Feb. 15, 1944 |
| 2,424,522 | Wasserman | July 22, 1947 |
| 2,433,384 | McLarn | Dec. 30, 1947 |
| 2,609,068 | Pajak | Sept. 2, 1952 |
| 2,656,808 | Plumeri et al. | Oct. 27, 1953 |
| 2,664,844 | Siegrist et al. | Jan. 5, 1954 |
| 2,722,735 | Beamish | Nov. 8, 1955 |